(12) United States Patent
Brouwer et al.

(10) Patent No.: US 6,640,953 B2
(45) Date of Patent: Nov. 4, 2003

(54) CONTROLLED GRAVITY ACCUMULATION CONVEYOR

(75) Inventors: Gerald A. Brouwer, Grandville, MI (US); Clint R. Lupton, Grand Rapids, MI (US)

(73) Assignee: Rapistan Systems Advertising Corp., Grand Rapids, MI (US)

( * ) Notice: Subject to any disclaimer, the term of this patent is extended or adjusted under 35 U.S.C. 154(b) by 0 days.

(21) Appl. No.: 10/099,451

(22) Filed: Mar. 15, 2002

(65) Prior Publication Data

US 2002/0157918 A1 Oct. 31, 2002

Related U.S. Application Data

(60) Provisional application No. 60/275,993, filed on Mar. 15, 2001.

(51) Int. Cl.$^7$ ................................................. B65G 1/08
(52) U.S. Cl. ............................... 193/35 A; 193/35 G
(58) Field of Search ................. 193/35 A, 35 SS, 193/35 G, 37; 198/781.05

(56) References Cited

U.S. PATENT DOCUMENTS

| 3,724,642 | A | * | 4/1973 | De Good ................... 193/35 A |
| 3,960,262 | A | * | 6/1976 | Henig ........................... 193/37 |
| 4,236,865 | A | | 12/1980 | Ullman ........................ 414/786 |
| 4,253,558 | A | | 3/1981 | Roeing et al. ............. 193/35 A |
| 4,264,005 | A | * | 4/1981 | Smock ......................... 198/781 |
| 4,383,598 | A | | 5/1983 | Newman ................... 193/35 A |
| 4,392,568 | A | * | 7/1983 | Turnbough et al. .......... 198/781 |
| 4,488,638 | A | | 12/1984 | Morgan et al. ............. 198/781 |
| 5,048,660 | A | | 9/1991 | Kilper ........................ 193/35 A |
| 5,086,903 | A | * | 2/1992 | Agnoff ....................... 193/35 A |
| 5,123,517 | A | * | 6/1992 | Windau .................... 193/35 SS |
| 5,375,689 | A | | 12/1994 | Sapp et al. ................ 193/35 A |
| 5,490,587 | A | | 2/1996 | Fisher ....................... 193/35 A |
| 5,806,661 | A | * | 9/1998 | Martin et al. .......... 198/781.05 |
| 5,934,438 | A | * | 8/1999 | Hilerich, Jr. .............. 193/35 A |
| 6,202,821 | B1 | * | 3/2001 | Crockett .................... 193/35 G |

FOREIGN PATENT DOCUMENTS

| EP | 0 236 191 | * | 2/1987 | ............... 193/35 A |
| JP | 3-95008 | * | 3/1991 | ............... 193/35 A |
| WO | WO 0006471 | | 2/2000 | |

OTHER PUBLICATIONS

International Preliminary Examination communication mailed Jan. 28, 2003 for application PCT/EP02/02809, which is the foreign counterpart to the present application.

* cited by examiner

Primary Examiner—Douglas Hess
(74) Attorney, Agent, or Firm—Van Dyke, Gardner, Linn & Burkhart, LLP

(57) ABSTRACT

A gravity conveyor includes one or more zones with each zone having at least one brake associated therewith. A controller turns the brakes on for each zone according to various programmable conditions. The downstream-most zone may have its brakes turned on whenever a package is present at the end of the conveyor. Any of the zones may have their brakes turned on in a pulsed manner. The zones may also have their brakes turned on in other situations, such as simultaneous blockage of that zone with another zone, the initial sensing of the leading edge of an article, as well as in other situations.

46 Claims, 10 Drawing Sheets

| Zone 1 brakes turned on in any of the following situations: | Length of time zone 1 brakes turned on for: |
|---|---|
| when product detected in zone 1. | until product removed from sensing area of zone 1 |

| Zone 2 brakes turned on in any of the following situations: | Length of time zone 2 brakes turned on for: |
|---|---|
| when pulsing enabled; | length of pulse |
| when both zones 1 and 2 are blocked with articles; or | approximately until either sensor in zones 1 or 2 stops detecting articles |
| when an article is removed from zone 1. | predetermined amount of time |

| Zone 3 brakes turned on in any of the following situations: | Length of time zone 3 brakes turned on for: |
|---|---|
| when pulsing enabled; or | length of pulse |
| when both zones 1 and 3 are blocked with articles. | approximately until either sensor in zones 1 or 3 stops detecting articles |

| Zone 4 brakes turned on in any of the following situations: | Length of time zone 4 brakes turned on for: |
|---|---|
| when pulsing enabled; or | length of pulse |
| when both zones 1 and 4 are blocked with articles. | approximately until either sensor in zones 1 or 4 stops detecting articles. |

| Zone 1 brakes turned on in any of the following situations: | Length of time zone 1 brakes turned on for: |
|---|---|
| when pulsing enabled; or | length of pulse |
| when product detected in zone 1. | until product removed from sensing area of zone 1 |

| Zone 2 brakes turned on in any of the following situations: | Length of time zone 2 brakes turned on for: |
|---|---|
| when pulsing enabled; | length of pulse |
| when both zones 1 and 2 are blocked with articles; | approximately until either sensor in zones 1 or 2 stops detecting articles |
| when photosensor 2 detects a leading edge of an article; or | predetermined amount of time |
| when product is removed from zone 1. | predetermined amount of time |

| Zone 3 brakes turned on in any of the following situations: | Length of time zone 3 brakes turned on for: |
|---|---|
| when pulsing enabled; | length of pulse |
| when both zones 2 and zone 3 are blocked with articles; or | approximately until either sensor in zones 2 or 3 stops detecting articles |
| when photosensor 3 detects a leading edge of an article. | predetermined amount of time |

CONTROLLED GRAVITY ACCUMULATION CONVEYOR

CROSS-REFERENCE TO RELATED APPLICATION

This application claims priority to U.S. provisional application Serial No. 60/275,993, filed Mar. 15, 2001, entitled Controlled Gravity Accumulation Conveyor, the disclosure of which is hereby incorporated herein by reference.

BACKGROUND OF THE INVENTION

This invention relates generally to conveyor systems, and more particularly to controls for a gravity conveyor.

A wide variety of conveyors are used to transport packages and other types of articles throughout warehouses and factories. Many of these conveyors are powered by motors that turn belts, rollers, slats, or other supports on which the products rest, thereby causing the products to move along the length of the conveyor. In one type of conveyor, known as a gravity conveyor, the conveyor is not powered, but rather is slanted downwardly and uses the force of gravity to cause products to move down the length of the conveyor. Usually the gravity conveyor includes a plurality of rollers which allows the products to roll down the conveyor on top of the rollers.

Gravity conveyors are often used at the end of a conveyor system. After the products roll down the gravity conveyor, the conveyor usually terminates with a bar, a case stop, or other means that are designed to prevent the packages from rolling off of the end of the conveyor. If the products are not lifted off of the conveyor at this point, they begin to accumulate at the bottom of the gravity conveyor and proceed to accumulate up the gravity conveyor as more packages arrive. In prior gravity conveyors, the packages that accumulate on the gravity conveyor exert a force on downstream packages due to gravity. When enough packages accumulate, this force can squeeze the package at the very end of the conveyor tightly against the bar, case stop, or other means that stop the packages. This squeezing force can significantly increase the difficulty of lifting the end package off of the conveyor because, in addition to the weight of the package, a person lifting a tightly squeezed package has to overcome the additional frictional forces from the adjacent upstream package and the stop. As more packages accumulate, the squeezing force increases, making the lifting process even more difficult and, in some cases, crushing the packages at the end. This is, of course, undesirable.

Prior gravity conveyors that are not controlled also suffer from the disadvantage that the speed of packages rolling down the gravity conveyor is not limited. Packages may therefore accelerate sufficiently to either themselves fall off the end of the conveyor, knock other packages off of the end of the conveyor, or both. Fast traveling packages coming down a gravity conveyor can also cause problems of pinching or injuring the hands of workers who lift the packages off of the end of the conveyor. Fast traveling can also cause severe damage to the contents of the packages. If a package containing fragile material travels down the conveyor right before a heavier package following it, the uncontrolled heavier package can easily damage the contents of the package with the fragile material. This increases costs and oftentimes customer dissatisfaction.

In the past, some of these disadvantages have been overcome by controlling the gravity conveyor through the use of brakes that selectively prevent one or more rollers on the gravity conveyor from turning. When the rollers on the conveyor are braked, the packages on top of the braked rollers tend to stop (absent slippage over the roller). In one prior art pneumatic system, a portion of the gravity conveyor includes brakes that are oscillated on and off at manually adjustable periods. By alternating the brake or brakes on and off, this system causes the packages to move down the conveyor incrementally, thereby avoiding the excessive speeds that are associated with uncontrolled gravity conveyors. This system, however, oscillates the brake or brakes on and off regardless of the presence or absence of packages, which can cause the system to unnecessarily waste energy when no packages are present, or when the packages have accumulated and are not being removed from the end of the conveyor. Also, because this system only covers a small portion of the total length of the conveyor and never locks the brakes on, it will allow the fall weight of the accumulated packages to push against the end package, thereby failing to alleviate the problem of the end package being excessively squeezed. Furthermore, the adjustability of the pneumatic controllers is very difficult and time-consuming, especially if there are multiple gravity conveyors within a given warehouse or plant. The desirability of a controlled gravity conveyor that overcomes these and other disadvantages can therefore be seen.

SUMMARY OF THE INVENTION

Accordingly, the present invention provides an improved control system and method for controlling a gravity conveyor that is more energy efficient, that tends to reduce the squeezing forces that are applied to the end packages at the bottom of the gravity conveyor, and that tends to deliver articles to the bottom of the conveyor in a manner that is more responsive to the speed at which a worker or workers are removing packages from the end of the conveyor.

According to one aspect of the present invention, a method is provided for controlling a gravity conveyor having a plurality of rollers arranged in a descending manner from an upper end to a lower end such that articles move by force of gravity down the conveyor. The method includes providing a sensor adapted to detect the presence or absence of an article at the lower end of the conveyor. A brake is also provided and located upstream of the sensor. The brake is adapted to be turned on or off. In the on condition, the brake substantially prevents at least one associated roller from rotating. In the off condition, the brake allows the at least one associated roller to rotate. The brake is turned on when the sensor detects an article at the lower end of the conveyor.

According to another aspect of the present invention, a gravity conveyor is provided that includes a plurality of rollers arranged in a descending manner from an upper end to a lower end such that articles move by force of gravity down the conveyor. The conveyor further includes a sensor, a brake, and a controller. The sensor is adapted to detect the presence or absence of an article at the lower end of the conveyor. The brake is located upstream of the sensor and is adapted to be turned on or off. In the on condition, the brake substantially prevents at least one associated roller from rotating. In the off condition, the brake allows the at least one associated roller to rotate. The controller is adapted to turn the brake on when the sensor detects an article at the lower end of the conveyor.

According to yet another aspect of the present invention, a gravity conveyor is provided having a plurality of rollers arranged in a descending manner from an upper end to a lower end such that articles move by force of gravity down said conveyor. The conveyor includes a plurality of zones, at least one sensor associated with each zone, and a controller. Each of the plurality of zones includes at least one brake adapted to prevent at least one associated roller from rotating when turned on. Each of the sensors are adapted to detect the presence or absence of articles within the vicinity of the sensor. The controller is adapted to send a pulsed signal to each of the brakes to turn each of the brakes on. The controller is further adapted to stop sending the pulsed signal when each of the sensors has not detected a change in the absence or presence of an article for more than a predetermined amount of time.

In other aspects of the invention, the controller may be a programmable logic controller or other logic-following controls means and the sensor may be a photo-eye positioned along the side of the gravity conveyor. By using a programmable logic controller or other logic-following controller, the parameters that are used to control a single conveyor can be duplicated for other similar conveyors. This duplication can lead to significant savings in time and money during the implementation of gravity controlled conveyor systems. The brake or brakes may be air-actuated brakes that hold the roller or rollers when high pressure is applied to the brake and release the roller or rollers when the high pressure is terminated. The gravity conveyor may further be divided into two or more zones, each having a sensor and at least one brake. Based on the absence or presence of detected articles in each zone, the brakes in one or more of the zones may be selectively activated. The selective activation of the brakes may further be based on the initial detection of an article in a zone, the simultaneous detection of articles in two zones, the removal of articles from the downstream-most zone, a cyclical pulsing signal, or a combination of any one or more of these factors.

The methods and apparatuses of the present invention provide a method and control system for controlling a gravity conveyor that operates with improved energy efficiency, that substantially eliminates the problem of unduly squeezed packages at the bottom of the gravity conveyor, and that provides generally improved delivery of the packages to the worker or workers at the bottom of the conveyor. These and other advantages of the present invention will be apparent to one skilled in the art in light of the following specification when read in conjunction with the accompanying drawings.

BRIEF DESCRIPTION OF THE DRAWINGS

FIG. 2A is block diagram depicting the relative orientation of FIGS. 2B and 2C;

FIG. 3 is a block diagram summarizing the control logic of the conveyor brakes according to one aspect of the present invention;

FIG. 5 is a block diagram summarizing the control logic of the conveyor brakes according to a second aspect of the present invention;

DETAILED DESCRIPTION OF THE PREFERRED EMBODIMENTS

Figure 1:
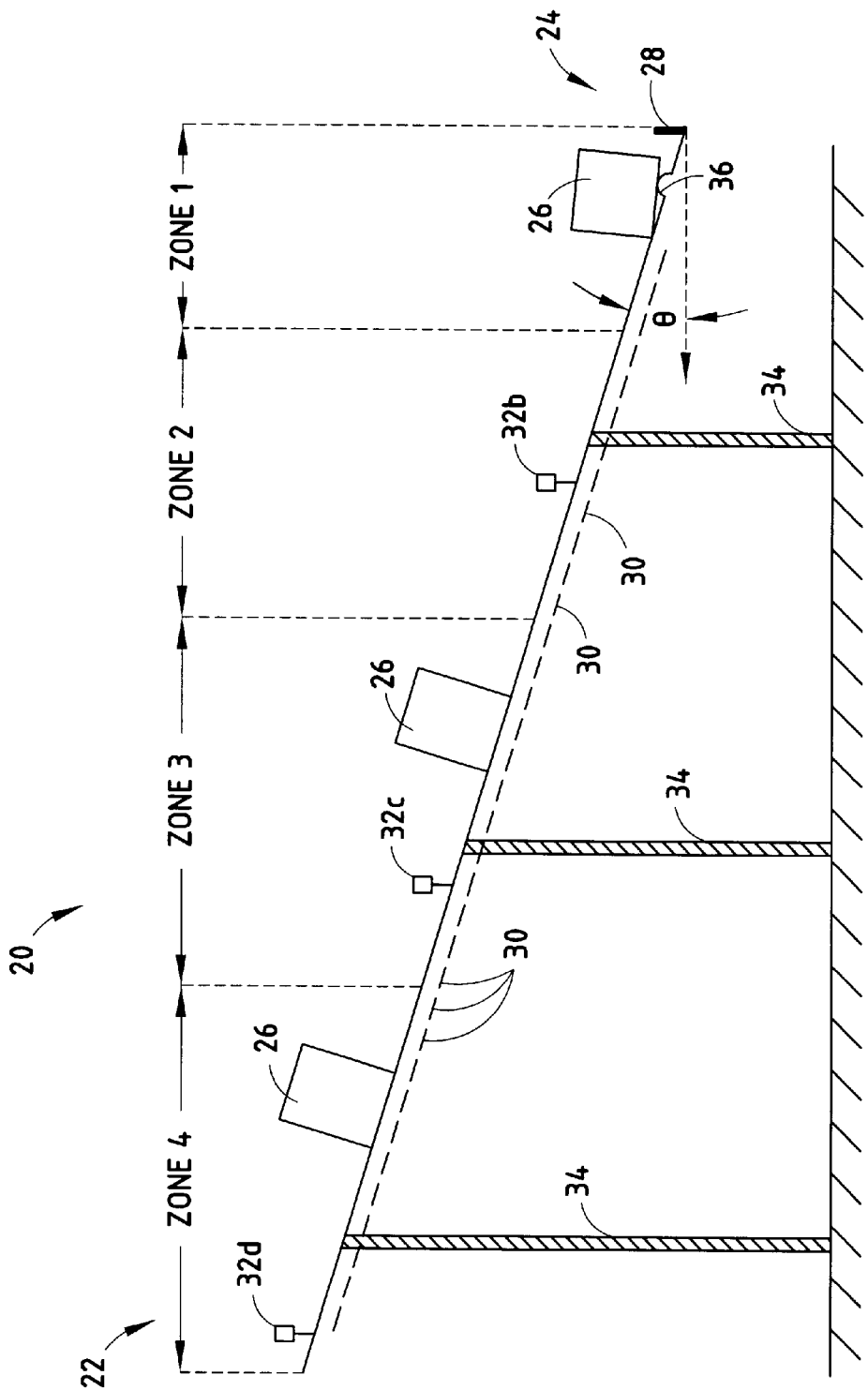
FIG. 1 is a side, elevational diagram of a gravity conveyor according to one aspect of the present invention.

The present invention will now be described with reference to the accompanying drawings where the reference numerals used herein correspond to like reference numerals in the several drawings. An example of a gravity conveyor 20, not drawn to scale, according to one embodiment of the present invention is depicted schematically in FIG. 1. Gravity conveyor 20 includes an upper end 22 and a lower end 24. A plurality of packages or articles 26 are depicted riding on gravity conveyor 20. As viewed in FIG. 1, articles 26 move from left to right down gravity conveyor 20 toward lower end 24. Gravity conveyor 20 may comprise a plurality of rollers (FIGS. 2B & 2C), or it may include other means for allowing packages to move downward along the length of the conveyor. A case stop 28 is located at the very end of lower end 24 of gravity conveyor 20. Case stop 28 is a physical obstruction at the end of the conveyor that serves to stop articles 26 from rolling off of the lower end of gravity conveyor 20. Gravity conveyor 20 further includes a plurality of brakes 30, sensors 32, and supports 34. An article raiser 36 may also be included at lower end 24 which helps to lift articles slightly up from the top of the conveyor, thereby allowing a person to insert their fingers under the article and more easily lift and remove the article from gravity conveyor 20. Article raiser 36 may simply be an upwardly slanted projection, or another type of mechanism. Gravity conveyor 20 is depicted in FIG. 1 as being slanted at an angle θ. It will be understood by those skilled in the art that this angle can vary as necessary for a given application, and that the methods and apparatuses of the present invention are equally applicable to all angles of conveyor slant.

In the illustrated embodiment, gravity conveyor 20 is divided into four zones. In operation, gravity conveyor 20 controls the descent of articles by selectively applying and releasing the brakes in each of the four zones. A controller 38—which may be a programmable logic controller, a series of relays, a microprocessor, a combinational logic circuit, or any other device that can implement logical instructions—controls the brakes for each of the zones based on information received from one or more of the sensors 32. By individually controlling the brakes 30 within each zone, controller 38 prevents the weight of all of the articles that may accumulate on gravity conveyor 20 from excessively squeezing the article at the very bottom of conveyor 20 (hereinafter referred to as "the end article"). Controller 38 accomplishes this by pulsing the brakes on and off in each section at certain times and holding the brakes on at certain other times so that, at most, only the weight of one or a small number of articles will bear against the end article, as will be explained more fully below. Controller 38 also saves energy by way of an energy management timer that stops the energy-consuming pulsing of the brakes when no activity is detected on conveyor 20 after a predetermined amount of time, which is also explained in more detail below.

Figure 2B:
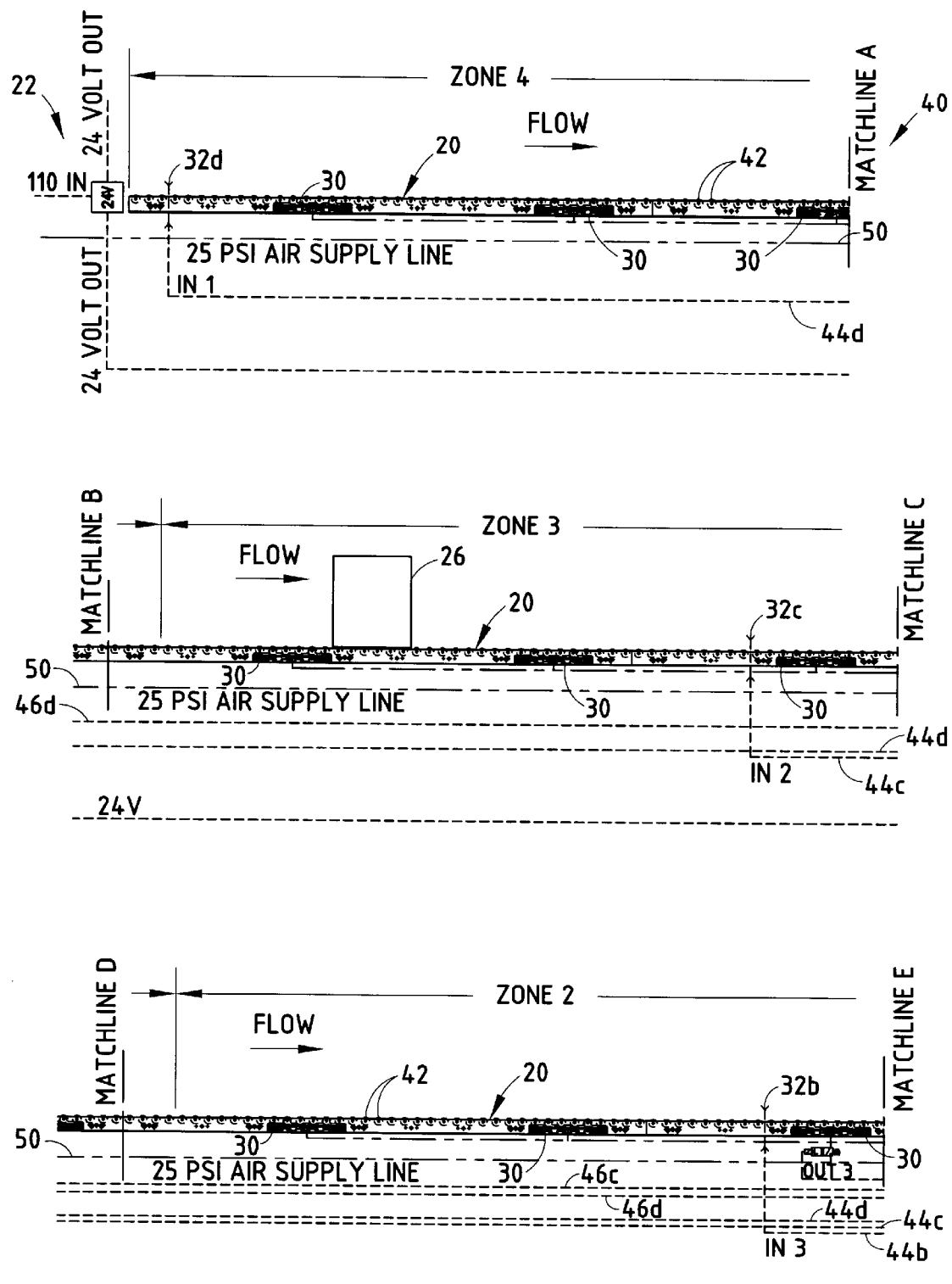
FIG. 2B is a first half of a gravity conveyor control system according to one aspect of the present invention.
Figure 2C:
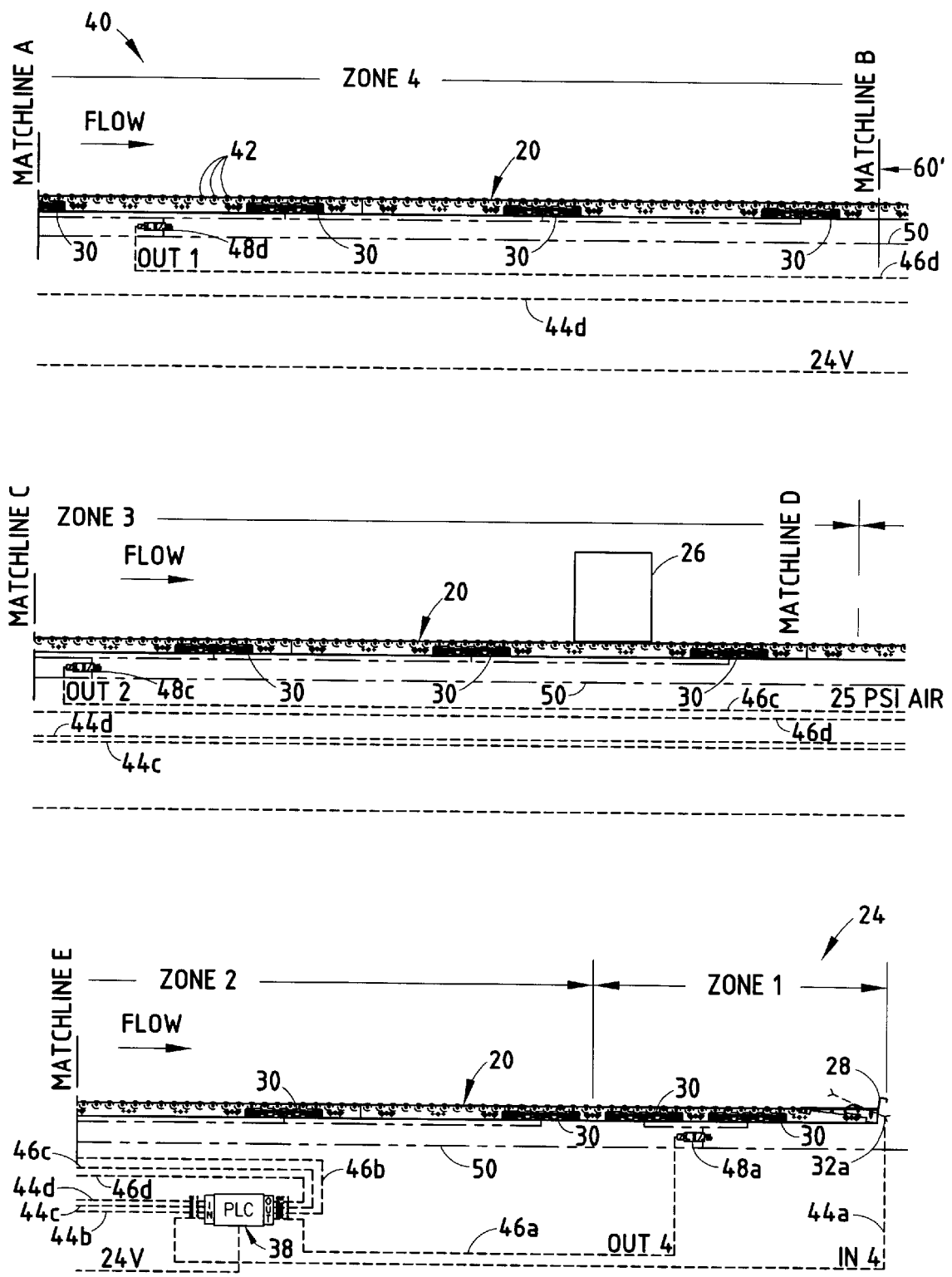
FIG. 2C is a second half of the gravity conveyor control system depicted in FIG. 2B.

FIGS. 2B and 2C depict a control system 40 for gravity conveyor 20. FIGS. 2B and 2C are left and right halves of a combined drawing, respectively, that are arranged as depicted in FIG. 2A. FIGS. 2B and 2C depict conveyor 20 in more detail, along with the control elements for controlling conveyor 20. While conveyor 20 is depicted in these two drawings as being horizontal, this is for illustration purposes only. An article placed at upper end 22 of conveyor 20 (upper left of FIG. 2B) will travel toward the right in the direction of the arrows labeled "Flow" down conveyor 20. Matchlines A–E are for illustration purposes only and depict the relationship of the three sections of conveyor on each of FIGS. 2B and 2C. Specifically, matchline A joins the right end of the uppermost section of conveyor 20 in FIG. 2B to the left end of the uppermost section of conveyor 20 in FIG. 2C. Matchline B at the right end of the uppermost section of conveyor 20 in FIG. 2C joins matchline B at the left end of the middle section of conveyor 20 in FIG. 2B. The other matchlines show the relationship of the other sections of conveyor 20 in FIGS. 2B and 2C.

Gravity conveyor 20 may include a plurality of rollers 42 on which articles 26 move, as depicted in FIGS. 2B and 2C, or it may include other means for allowing articles 26 to move by force of gravity down conveyor 20. In the illustrated embodiment, each of the four zones includes at least one sensor. Sensor 32a, which may be a proximity sensor, is located in zone 1 at any position that allows it to detect the absence or presence of an article 26 at lower end 24. As illustrated in FIG. 2C, sensor 32a is positioned underneath the conveying surface of conveyor 20 and senses the presence or absence of article via one or more holes cut in conveyor 20. As an alternative to proximity sensors, sensor 32a could comprise a photo-eye, or any other sensor, as would be known by one skilled in the art. Sensors 32b–d are positioned alongside conveyor 20 in zones 2–4, respectively. Sensors 32b–d may be photo-eyes that emit a beam of light, or other electromagnetic energy, across conveyor 20 and detect whether the beam is interrupted by an article or not. Other sensors can, of course, be used within the scope of the invention. The outputs of sensors 32a–d travel on lines 44a–d, respectively, into controller 38.

Controller 38 includes a plurality of control outputs 46a–d that travel to a plurality of control valves 48a–d, respectively. Control valves 48a–d control the operation of brakes 30. Specifically, control valve 48a controls the brakes in zone 1; control valve 48b controls the brakes in zone 2; control valve 48c controls the brakes in zone 3; and control valve 48d controls the brakes in zone 4. In the illustrated embodiment, each control valve 48 is operably coupled to a source of pressurized air 50. When an "on" signal is received from line 46, control valve 48 connects the source of pressurized air to each of the brakes in the respective zone, thereby causing the activated brakes to stop the rollers from turning. When an "off" signal is received from line 46, control valve 48 allows the pressurized air being delivered to the brakes to be vented, thereby causing the brakes to turn off and allow the rollers to rotate. While control valves 48 are depicted as conventional solenoid operated valves, any suitable control mechanism can be substituted for control valves 48. As one example, the present invention finds equal application to a control system in which the brakes were turned on and off via electricity, rather than pressurized air. Other examples are possible.

Control valves 48 selectively connect each brake 30 in a particular zone to the source of pressurized air 50. Thus, if controller 38 outputs an "on" signal along line 46c, control valve 48 will connect each brake 30 in zone 3 to the pressurized air 50, causing each brake 30 in that zone to be activated. Brakes within each zone are therefore controlled in unison, while brakes in different zones can be controlled independently from each other. Each brake 30 comprises an elongated brake pad 56 that physically moves into contact with six adjacent rollers 42 to thereby substantially prevent these six rollers from moving. While the operation and construction of brakes 30 will be described in more detail below, it should be understood that the particular design of brakes 30 can vary widely within the scope of the invention. As one example, the present invention contemplates the use of a single brake in each zone where the brake extends for a substantial length of the zone. By using such a single brake, the non-braking spaces between individual brakes 30 is eliminated. Other variations are possible.

Figure 4:
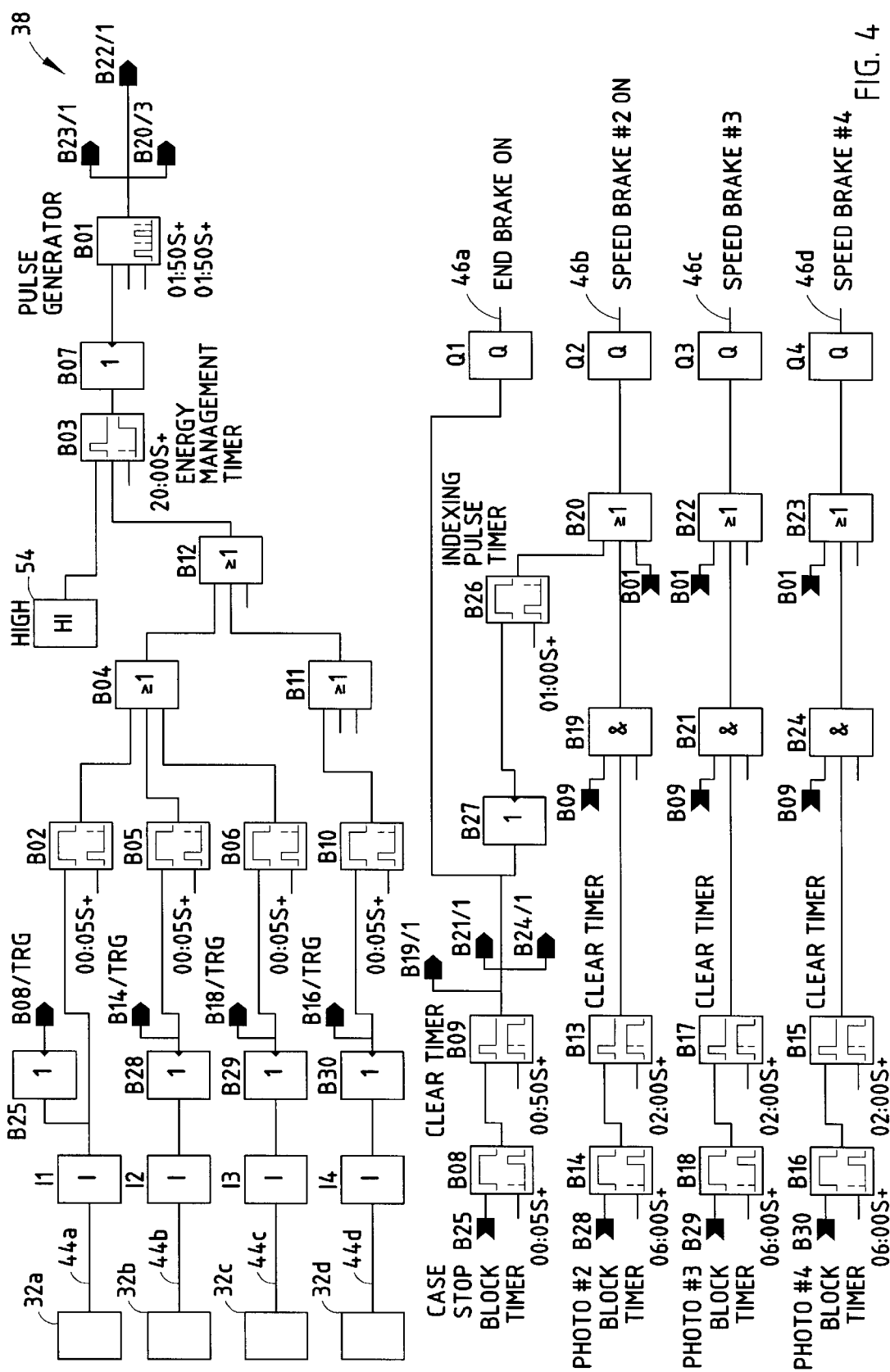
FIG. 4 is a block diagram illustrating control circuitry for implementing the control logic of FIG. 3.

One embodiment of the control logic followed by controller 38 is summarized in FIG. 3. An example of programmable logic controller (PLC) elements that can be used to implement this logic is depicted in FIG. 4. Before describing this logic in detail, a general overview of some of the control features of control system 40 will be described. In general, the brakes 30 in zone 1 can be described as line pressure brakes that help control the amount of upstream pressure exerted on the end article. When the brakes in zone 1 are turned on, i.e. the rollers are prevented from rotating, the articles on rollers in zone 1 are held in place (absent slippage). By being held in place, they are not free to roll downward against the end article, and therefore they do not exert any pressure against the end article. (In the case of slippage, the pressure exerted may be reduced, rather than completely eliminated). Additionally, the brakes in zone 1, when turned on, substantially prevent any pressure being applied to the end article from articles in higher zones because the held articles in zone 1 also tend to hold upstream articles. The brakes in zone 1 therefore help control the amount of pressure exerted against the end article.

The brakes in the higher zones can be described as both speed control and line pressure brakes. They act as speed control brakes because they generally tend to control the speed of the articles rolling down gravity conveyor 20. By intermittently turning these brakes on, the articles rolling down conveyor 20 are intermittently stopped. The amount of time between intermittent stops determines the amount of acceleration that an article can undergo, and thus its speed. By intermittently stopping the articles more frequently, the articles will have less time to accelerate, and therefore will tend to travel down conveyor 20 at lower speeds. In addition to speed control, the brakes in zones 2 to 4 (or higher) can also serve to limit the pressure against the end article in the present invention when they are locked. If the articles accumulate from lower end 24 of conveyor 20 all the way up into one of the higher zones, controller 38 may lock the brakes on in one or more of these higher zones, thus preventing the weight of these articles from being exerted against the end article. The brakes in zones 2–4 are therefore also line pressure control brakes as well as speed control brakes.

In the embodiment of FIGS. 3–4, the brakes in zones 2–4 generally tend to be switched on and off intermittently. As described above, this prevents the articles from traveling down gravity conveyor 20 too quickly and slamming against the end article, or the case stop 28. The intermittent activation of the brakes uses energy in the form of pressurized air. Whenever the brakes 30 are turned off, the pressurized air is exhausted from the brakes, causing them to collapse away from the rollers to thereby allow the rollers to rotate. Thus, if no activity is happening on gravity conveyor 20, the intermittent pulsing of the brakes 30 would unduly waste this energy. The present invention overcomes this problem by including an energy management timer. Whenever the energy management timer has continuously run for a predetermined amount of time, controller 38 turns off the intermittent activation of the brakes 30. The energy management timers runs uninterrupted whenever no activity is detected on conveyor 20. Specifically, whenever sensor 32a changes from sensing the presence of an article to sensing its absence, or sensors 32b–d change from sensing the absence of an article to sensing their presence, the energy management timer is reset. (Of course, it would be possible to modify the control logic to reset timer B03 every time any of sensors 32a–d changed from sensing an articles absence to its presence, or vice versa, if desired). Thus, as long as activity is occurring on conveyor 20, the energy management timer will continue to be reset such that the predetermined amount of time is never reached, and the pulsing continues. However, if sensors 32a–d fail to sense one of the noted changes in status for a predetermined amount of time, controller 38 stops the pulsing of the brakes 30. This may happen when there are no articles entering conveyor 20 for a predetermined amount of time, or if articles have accumulated up the entire length of conveyor 20 and are not being removed from lower end 24 for a predetermined amount of time. In either case, the outputs from each individual sensor 32 will not change and the pulsing will stop automatically after a predetermined time period. Thus if a person working at lower end 24 of conveyor 20 goes on break, or a shift ends, the pulsing of brakes 30 on conveyor 20 will automatically stop while he or she is gone, and automatically start up again when he or she returns and starts removing articles from conveyor 20. The energy management timer thus helps conserve energy.

Controller 38 also implements an indexing function which helps assure that only one or a small number of articles are presented to the operator at lower end 24 at a time. This helps avoid the problem of undue pressure squeezing the end article. The indexing function works by turning the brakes 30 off in zone 1 shortly, or immediately, after the removal of the end article by an operator. At the same time the brakes in zone 1 are turned off, the brakes in zone 2 are turned on for at least a short amount of time. The release of the brakes in zone 1 causes the remaining article(s) in zone 1 that were upstream of the end article to roll downward to case stop 28. Meanwhile, the activation of the brakes in zone 2 prevents any articles in zone 2 from rolling downward. The weight of the articles in zone 2 thus does not exert any pressure against the end article. Also, because zone 1 is relatively small, only one or a small number of articles will remain after the end article is removed, thereby preventing substantial pressure from being exerted against the newest end article. The indexing function thus solves the problem of having to lift an end article that is tightly squeezed between excessive upstream articles and the case stop.

Another feature of the control system 40 of the present invention is the holding of brakes 30 on in zones 2–4 as necessary to help prevent excessive line pressure against the end article. Whenever sensors 32b–d are blocked for a period of time (that is, non-moving articles are detected), the respective zone is considered to be "full." Whenever the brakes in zone 1 are on and a particular zone is in the full state, the brakes in that particular zone are kept on. This helps reduce line pressure against the end article. Furthermore, because the sensors 32b and c are positioned downstream of the highest brakes within their respective zones, the holding of the brakes in zones 2 or 3 will tend to create an air gap between the articles upstream of the sensor within that zone, further reducing line pressure. The sensors in zones 2 and 3 are thus preferably, although not necessarily, placed at a downstream position from the uppermost brake within that zone.

FIG. 3 summarizes the different situations when controller 38 will switch on the brakes in each zone. For zone 1, controller 38 simply turns on the brakes when sensor 32a detects an article. When the article is no longer detected, controller 38 turns off the brakes in zone 1. Because sensor 32a is preferably positioned such that it will only sense the end article of zone 1, and not any zone 1 articles that may be upstream of the end article, the brakes in zone 1 will turn off each time an article is removed. The removal of an article thus frees the one or two upstream articles of zone 1 to roll further downstream until a new end article arrives at sensor 32a, which causes the brakes to be re-applied.

As illustrated in FIG. 3, one situation that causes the brakes in zones 2, 3, and 4 to turn on is a regular pulsed signal that is sent out by controller 38 to each of these brakes. This pulsed signal is enabled by a timer set to a predetermined amount of time. The pulsed signal continues as long as the timer does not expire. The timer is the energy management timer referred to above and operates in the same manner described previously. In essence, the pulsing in all of the zones upstream of zone 1 is therefore enabled whenever there is activity on the gravity conveyor (as well as for a predetermined amount of time thereafter).

In addition to the pulsing on of the brakes, the brakes in zone 2 may also be turned on for two additional reasons (FIG. 3). First, whenever an article is removed from zone 1 (i.e. whenever sensor 32a changes from sensing an article to not sensing an article), the brakes in zone 2 are turned on for a predetermined amount of time. Second, whenever an article is detected in zone 1 while zone 2 is simultaneously blocked, the brakes in zone 2 turn on. They remain on until either the article in zone 1 is removed, or zone 2 is no longer blocked.

In addition to the pulsing signals sent to the brakes in zones 3 and 4, signals to turn these brakes on are also sent in one other situation. (FIG. 3). If zone 3 is blocked while an article is detected in zone 1, then the brakes in zone 3 are turned on. Similarly, if zone 4 is blocked while an article is detected in zone 1, then the brakes in zone 4 are turned on. In either case, the brakes remain on until either that zone becomes unblocked, or an article is removed from zone 1.

It should be noted that the various different reasons for turning the brakes on summarized in FIG. 3 are cumulative. In other words, any one of these situations will cause the brakes to turn on for the specified time period. If multiple conditions are present at the same time, the brakes will turn on for the longest amount of time of the various conditions. For example, suppose that the pulsing is enabled and that zone 3 is blocked while an article is being detected in zone 1. Thus both conditions are present for turning on the brakes in zone 3. If zone 3 remains blocked while an article is present in zone 1 for longer than the duration of the pulse, then the brakes in zone 3 will remain on for longer than the pulse duration. On the other hand, if zone 3 becomes unblocked or the article in zone 1 is removed before the end of one of the pulses occurs, the brakes will remain on until the end of the pulse occurs. Stated alternatively, "off" signals are never sent to the brakes in the illustrated embodiment. The brakes are switched off only in the absence of an "on" signal. It will be understood that this arrangement could be reversed, or otherwise varied. For example, the present invention could be implemented by sending "off" signals to brakes that otherwise remained on. These could be sent when all of the conditions specified in FIG. 3 for a particular zone were unmet. Other variations are possible.

A detailed method of implementing the logic of controller 38 is depicted in FIG. 4. The logic can be implemented in a programmable logic controller, or by any other means. Lines 44a–d feed into inputs I1–I4 from sensors 32a–d. In the illustrated embodiment, sensors 32 are configured to emit a high signal when no articles are detected by the individual sensor, and a low signal when an article is detected. Inputs I2–I4 feed into blocks B25, B28, B29, and B30, which are inverters that invert the signal received from the respective input. The output of block B25 is fed into block B08, as indicated by the shorthand notation in FIG. 4 for this connection. In addition to being fed into block B25, input I1 is fed into a timer B02, which is set in this embodiment to 0.05 seconds (which, of course, can be varied to other times, as would be understood by one skilled in the art). Timer B02 acts in a fashion similar to a one-shot multivibrator. When the input into B02 goes high, timer B02 detects the rising edge of the input and sets the output of B02 high for a 0.05 second period of time. The output of B02 is fed into an OR function B04 which also receives the outputs from timers B05 and B06. The output of OR function B04 is then fed into another OR function B12 which receives an input from OR function B11. The output of OR function B12 is fed into a timer B03 that implements the energy management timing function. The timer B03 is always enabled by a high signal coming from block 54. The output of OR function B12 feeds into a reset input on timer B03 which causes timer B03 to reset whenever this input goes high. Timer B03 will therefore only output a high signal to inverter B07 when no input has been received from OR function B12 for the length of the timing cycle, which in the illustrated embodiment is 20 seconds. B07 inverts the signal from the output of timer B07 and feeds it to a pulse generator B01. Pulse generator B01 feeds into blocks B20, B22, and B23, as described in more detail below.

Sensors 32b–d feed into inputs I2–I4 through lines 44b–d, respectively. Inputs I2–4 are each fed into inverters B28, B29, and B30, respectively, as noted above. The outputs of each of these inverters is then split. The output of inverter B28 is split between block B14 and timer B05. The output of inverter B29 is split between block B18 and timer B06. The output of inverter B30 is split between block B16 and timer B10. Timers B05, B06, and B10 function identically to timer B02. The outputs of timers B05, B06, and B10 are fed into OR functions B04 and B11, as illustrated in FIG. 4. OR functions B04, B11, and B12 operate to reset the energy management timer whenever sensor 32a switches from sensing an article's presence to its absence, or any one of sensors 32b–d switches from sensing an article's absence to its presence. OR functions B04, B11, and B12 could be replaced by a single, four-input OR function that receives the outputs from timers B02, B05, B06, and B10, and which has its output connected to timer B03.

As illustrated, timers B08, B14, B18, and B16 receive their inputs from the outputs of timers B25, B28, B29, and B30, respectively. Timers B08, B14, B18, and B16 are delay timers that output a high signal only after their inputs have remained on for a predetermined amount of time. For timer B08, the predetermined amount of time is 0.05 seconds. For timers B14, B18, and B16, the predetermined amount of time is 6 seconds. The output of timer B08 is fed into an off timer B09. Off timer B09 immediately outputs a high signal when its input goes high and continues to output a high signal while its input is high. When its input goes low, timer B09 continues to output a high signal for a predetermined amount of time thereafter—in the illustrated embodiment for 0.5 seconds. The purpose of timers B08 and B09 is to avoid acting on fast oscillations of the outputs of the sensor 38a. Timers B08 and B09 thus provide a sort of hysteresis that prevents action being taken on changes in the output of the sensor that don't last for the predetermined amount of times. The output of timer B09 is then split between blocks B19, B21, B24, inverter B27, and output Q1. Output Q1 is coupled to line 46a which in turn is connected to control valve 48a. When output Q1 is high, the brakes in zone 1 are activated. When output Q1 is low, the brakes in zone 1 are turned off. Inverter B27 feeds into an indexing pulse timer B26 that outputs a high signal for a predetermined time period when the rising edge of its input is detected. In the illustrated embodiment, the high signal is output for 1.0 second. This time can be varied as desired with shorter times delivering articles to the bottom of the conveyor at a faster rate, and vice versa. This high signal serves the function of holding the brakes on in zone 2 for at least a second after an end package is removed from lower end 24 of conveyor 20. The output of timer B26 is fed into an OR function B20 which has its output connected to output Q2. Output Q2 is connected to line 46b and therefore turns the brakes on in zone 2 whenever the input into Q2 is high.

Block B14, like blocks B18 and B16, has a timer that is set to six seconds. When the input into block B14 has been on for six seconds, it will output a high signal into off timer B13. Off timer B13 will output a high signal for as long as its input is high, plus it will output a high signal for two seconds after its input goes low. It will then output a low signal. The output of timer B13 is fed into an AND function B19, which also receives an input from the output of block B09. The output of AND function B19 is fed into one input of OR function B20, which also receives inputs from index pulse timer B26 and pulse generator B01.

Timer B18 operates in the same fashion as timer B14, described above, and outputs a high signal to timer B17 after its input has gone high for at least six seconds. Timer B17 outputs a high signal whenever its input goes high, and continues to output a high signal for two seconds after its input goes low. The output of timer B17 is fed into an AND function B21 which also receives an input from timer B09. The output of AND function B21 is fed into an OR function B22, which also receives an input from pulse generator B01. The output of OR function B22 is fed into output Q3, which is coupled to line 46c. Whenever output Q3 goes high, brakes 30 in zone 3 will be activated.

Timer B16 operates in the same fashion as timers B14 and B18, described above, and outputs a high signal to timer B15 after its input has gone high for at least six seconds. Timer B15 outputs a high signal whenever its input goes high, and continues to output a high signal for two seconds after its input goes low. The output of timer B15 is fed into an AND function B24 which also receives an input from timer B09. The output of AND function B24 is fed into an OR function B23, which also receives an input from pulse generator B01. The output of OR function B23 is fed into output Q4, which is coupled to line 46d. Whenever output Q4 goes high, brakes 30 in zone 4 will be activated.

It can be seen from FIG. 4 and the foregoing description that zones 2–4 (Q2–Q4) will normally have their brakes pulsating when the energy management timer has not timed out and when the pulsing is not being overridden by the activity in zone 1. The activity in zone 1 affects the pulsing of zones 2–4 via timer B09 which feeds into AND functions B19, B21, and B24. If the output of any of these AND functions is high, the brakes for the respective zone will remain on without pulsing for the duration of this condition.

From the foregoing description it should also be clear to one skilled in the art that the control system 40 of the present invention can be implemented using anywhere from two zones to an unlimited number of zones. If, for example, only three zones are desired, the input I4 in FIG. 3 is simply removed, along with blocks B30, B10, B11, B16, B15, B24, B23, and output Q4. Such a removal still allows the remaining three zones to be controlled in the same manner as has been described with respect to the four illustrated zones. On the other hand, if a fifth zone is desired, a fifth input into controller 38 is required. Such an input would be fed through an identical series of timers, functions, and blocks as inputs I3 or I4, and would have an output I5 that would be fed to the brakes in the fifth zone.

Figure 6:
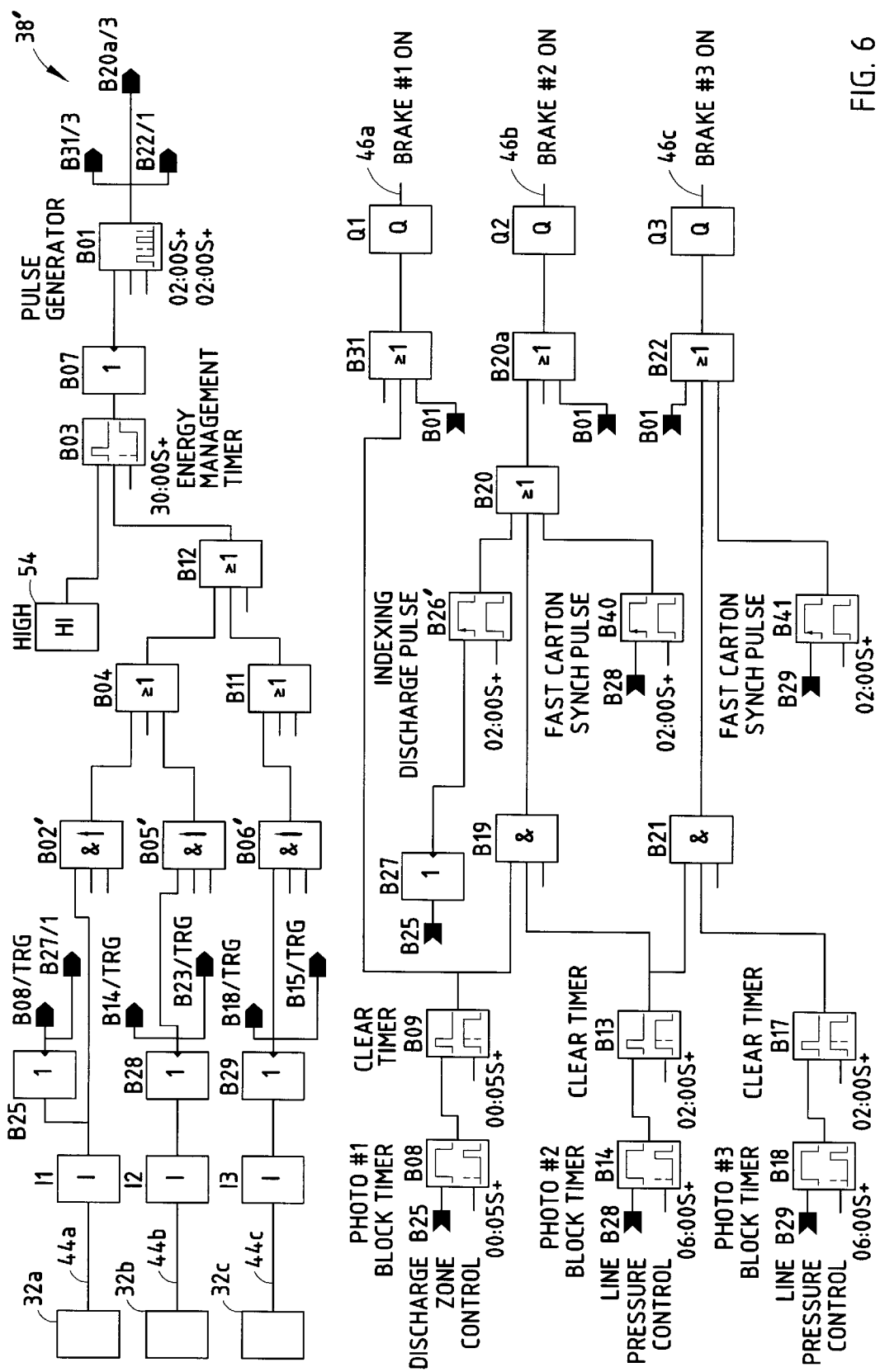
FIG. 6 is a block diagram illustrating control circuitry for implementing the control logic of FIG. 5.

An alternative controller 38' that can be used in accordance with the present invention is depicted in FIG. 6. A summary of the control logic implemented in FIG. 6 is depicted in FIG. 5. Controller 38' is illustrated controlling a three zone gravity conveyor, but, like controller 38, the control logic of controller 38' can be adapted to a greater or fewer number of zones. The control logic of FIGS. 5 and 6 can be implemented on gravity conveyor 20 depicted in FIGS. 1–2 where the only modification are the removal of zone 4 and the relocation of sensor 32c to a position adjacent the upstream end of zone 3. As can best be seen in FIG. 5, the conditions for turning on the brakes in controller 38' are somewhat different from controller 38. The pulsing of the brakes in controller 38' is applied to zone 1 and all the other zones, unlike controller 38 which does not pulse zone 1's brakes. The zones upstream of zone 1 also have their brakes turned on whenever they are blocked and the adjacent downstream zone is detecting articles. Further, the zones upstream of zone 1 also turn on their brakes for a predetermined amount of time whenever they detect the leading edge of an article. The details of implementing this logic are illustrated in FIG. 5.

The components of FIG. 5 in common with FIG. 3 are identified with the same designation. Variations in the type (but not the time values) are indicated by using the same designation followed by a prime symbol ('). Sensors 32a–c feed into inputs I2–3 on lines 44a–c, respectively. Input I1 is fed directly into an Edge Triggered And function B02'. Inputs I2 and I3 pass through inverters B28 and B29, respectively, before being fed into Edge Triggered And functions B05' and B06'. Edge Triggered And functions B02', B05', and B06' provide a high output for a short duration (such as one scan in a PLC) after each time their input goes from low to high. The outputs of B02', B05', and B06' are OR'd together via OR functions B04, B12, and B11. (Note that B11 could be eliminated, but provides an additional input for receiving signals from additional sensors that would be used if controller 38' were used to control a conveyor having 4 or more zones). OR function B12 inputs into the energy management timer B03. The operation of energy management timer B03 in FIG. 6 is the same as that described previously with respect to FIGS. 3 and 4 with the sole exception that the time is changed from 20 seconds to 30 seconds. The length of time for timer B03 is a matter of preference, although it may generally be desirable to increase this time for conveyors having greater length.

The outputs of inverters B25, B28, and B29 are fed into the inputs of timers B08, B14, and B18, respectively (FIG. 6). Timers B25, B28, B29, B09, B13, and B17 function in the same manner as was described previously with respect to FIG. 3. The output of timer B09 is fed into OR function B31 where it is OR'd together with the pulses from pulse generator B01. Thus, the brakes for zone 1 will turn on either as a result of B01's on pulses, or as a result of sensor 32a detecting an article in zone 1. The output of timer B09 is also fed into AND function B19 which receives another input from timer B13. The output of AND function B19 passes through OR functions B20 and B20a to the brakes for zone 2. B19 therefore turns the brakes on in zone 2 whenever zone 2 is blocked and an article is detected by sensor 32a in zone 1. Timer B26' performs an indexing function that also turns the brakes in zone 2 on for a predetermined amount of time (e.g. 2 seconds) after sensor 32a in zone 1 detects the removal of an article. Finally, the brakes in zone 2 are turned on for a predetermined amount of time (e.g. 2 seconds) by timer B40 whenever sensor 32b initially detects an article (i.e. whenever the leading edge of an article is detected) in zone 2.

Zone 3's brakes are turned on in situations analogous to the reasons for turning on zone 2's brakes, except that zone 3 is not responsive to an indexing timer, such as timer B26'. Zone 3's brakes are therefore turned on by timer B21 whenever both zones 2 and zones 3 are blocked. Zone 3 brakes are also pulsed on by the signals from pulse generator B01 received at OR function B22. Further, zone 3's brakes are also turned on by timer B41 for a predetermined amount of time (e.g. 2 seconds) whenever sensor 32c initially detects an article (i.e. whenever the leading edge of an article is detected) in zone 3. If additional zones are to be controlled by controller 38', they could be controlled in the same manner as zone 3. Namely, the additional brake zones could be turned on in any of three situations: (1) pulsing from generator B01, (2) simultaneous blockage of that zone and an adjacent downstream zone, or (3) the initial detection of a leading edge of an article in that zone. Different permutations and combinations of these conditions could be used for turning on the brakes in the additional zones. In fact, for both controllers 38 and 38', the present invention contemplates turning on any of the brakes by using any desired subset of the various conditions illustrated in FIGS. 3 and 5. Thus, as one example, the present invention could be carried out by turning on zone 1's brakes according to the conditions of zone 1 in FIG. 5 while turning on the remaining zones only by way of a pulsing signal. Many other permutations are possible.

The times specified in FIGS. 4 and 6 can be varied considerably: As will be understood by one skilled in the art, these various times may desirably be adjusted depending upon the general size and weight of the articles, the steepness of the conveyor, and the particular placement of the sensors and brakes on the conveyor, as well as other considerations. For example, timers B14, B18, and B16 are set to only output a high signal after the input has remained on for six seconds. The six second period is based on an estimate of the amount of time it will take for a long article to pass by a sensor. Thus, only if a sensor is blocked for more than six seconds will it be assumed that the article sensed by the sensor is not moving and that that particular zone is blocked. If the conveyor is steeper, or has relatively heavier packages that tend to move down the rollers faster, the six second period may be reduced, if desired. As another example, the pulse generator B01 in FIG. 3 sends out a high signal every 1.5 seconds that remains high for 1.5 seconds. (2 seconds on and 2 seconds off in FIG. 5). Again, these times can be varied. The length of the pulse may be set such that the brakes remain on long enough for the relatively heavy packages to stop their initial skidding on the brakes and come to a complete stop. The time between the pulses may be set such that the relatively lighter packages take two cycles to make it past a brake.

In the embodiment described in FIGS. 3–4, the times used by the control logic for gravity conveyor 20 were chosen based partially on the conveyor having an angle θ equal to 7.5 degrees. In the embodiment described in FIGS. 5–6, the times used by the control logic for gravity conveyor 20 were chosen based partially on the conveyor having an angle θ equal to 10 degrees. It will be understood that these angles can vary as desired for a given application, and that the times used by the control logic can be adjusted accordingly, if desired. In addition to the adjustments described above, it may be desirable—if conveyor 20 is angled more steeply—to either increase the frequency of pulse generator B01, or increase the duration at which the brakes in zones 2–4 stay on when activated by pulse generator B01. Alternatively, if conveyor 20 is less steep, the period of pulse generator B01 may desirably be increased.

Figure 7:
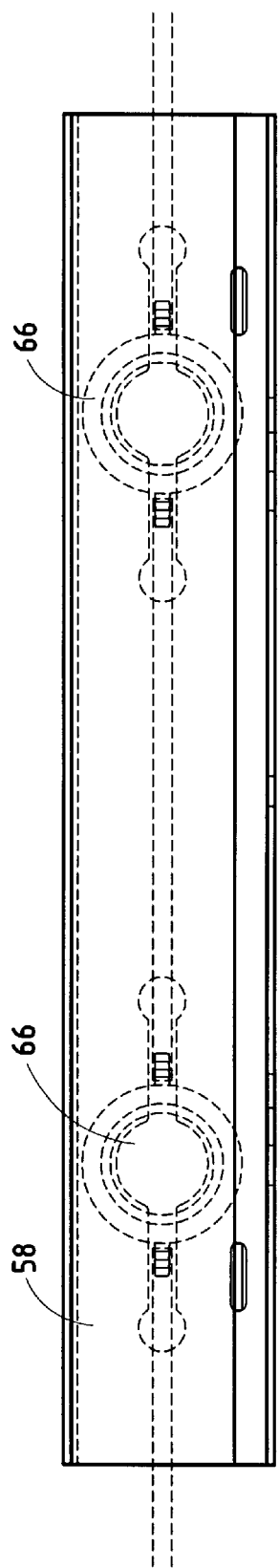
FIG. 7 is a plan view of a movable brake support.
Figure 8:
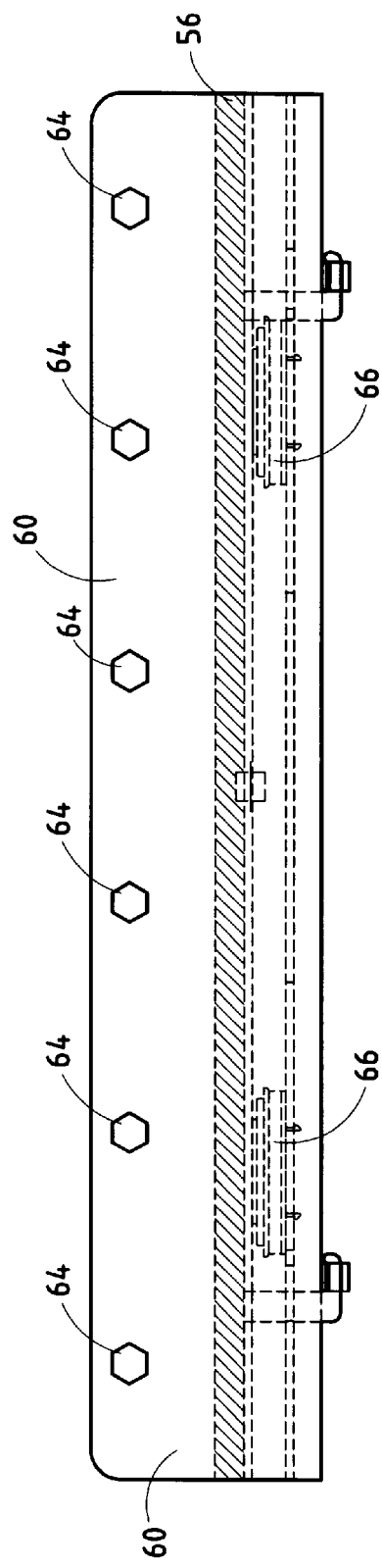
FIG. 8 is a side, elevational view of a stationary brake support.
Figure 9:
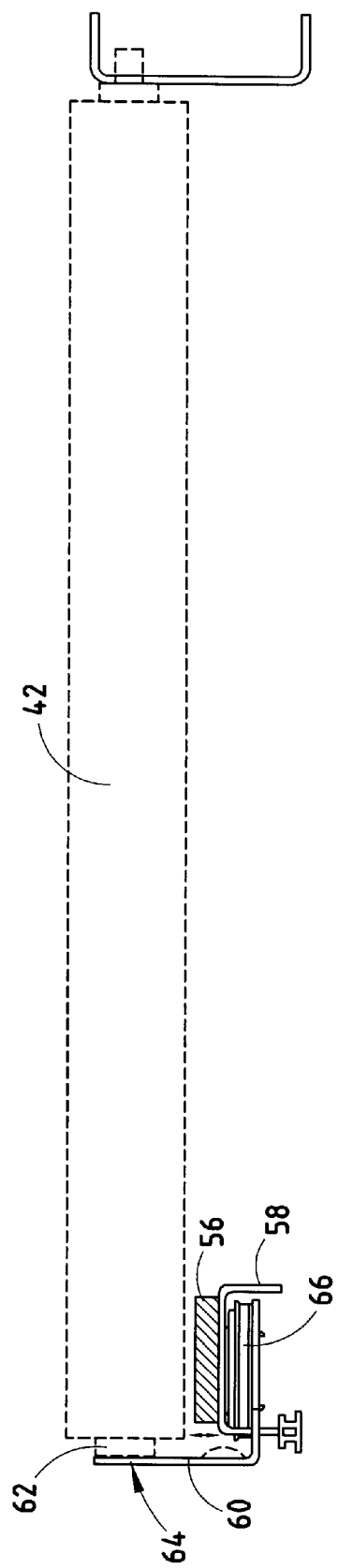
FIG. 9 is a front, elevational view of the brake supports of FIGS. 4 and 5 shown attached to a conveyor.

One example of brakes 30 that can be used in accordance with the present invention is depicted in FIGS. 7–9. Brake 30 includes a brake pad 56 which selectively abuts against the underside of a plurality of rollers and thereby selectively prevents them from rotating. Brake pad 56 is located on a movable support 58 which in turn is supported on a stationary support 60. Stationary support 60 is supported on conveyor 20 by way of the axles 62 of rollers 42. Axles 62 fit through apertures 64 defined in stationary support 60 (FIG. 7). Stationary support 60 includes a pair of air pucks 66 that are selectively inflatable via pressurized air supply 50. When inflated, air pucks 66 push movable support 58 upwards such that brake pad 56 engages the underside of the rollers 42, thereby preventing rotation. When deflated, air pucks 66 allow movable support 58 to fall back down to a rest position wherein brake pad 56 is not in contact with rollers 42. While the illustrated brakes 30 are elongated sufficiently to engage six rollers 42 at a time, this can, of course be varied. In fact, any types of brakes that substantially prevent movement of articles over a defined area of conveyor 20 can be used within the scope of the invention.

In a factory installation having multiple gravity conveyors, it may be desirable to have controller 38 or 38' control more than one of the gravity conveyors. In this manner, changes in the timing or control logic for each conveyor can be accomplished by making changes to a single controller. Such multiple-conveyor control is easily carried out when controller 38 or 38' is a programmable logic controller, although other types of controllers can be used for this. Regardless of whether a single or multiple controllers are used, the controller may preferably include a user interface that allows relatively easy changes to be made in the control logic. While the present invention has been described in terms of the preferred embodiments depicted in the drawings and discussed in the above specification, along with several alternative embodiments, it will be understood by one skilled in the art that the present invention is not limited to these particular embodiments, but includes any and all such modifications that are within the spirit and the scope of the present invention as defined in the appended claims.

What is claimed is:

1. A method of controlling a gravity conveyor having a plurality of rollers arranged in a descending manner from an upper to a lower end such that articles move by force of gravity down said conveyor, said method comprising:

providing a first sensor adapted to detect the presence or absence of an article at the lower end of the conveyor;

providing a first brake located upstream of said first sensor, said first brake adapted to be turned on or off, said first brake substantially preventing at least one associated roller from rotating when turned on and allowing the at least one associated roller to rotate when turned off;

sending a pulsed signal having a defined frequency to said first brake, said pulsed signal adapted to cause said first brake to cyclically turn on: and also turning said first brake on when said first sensor detects an article at the lower end of the conveyor.

2. The method of claim 1 further comprising keeping said first brake turned on for at least as long as said first sensor detects an article.

3. The method of claim 1 further comprising turning said first brake off between the pulses of said pulsed signal whenever said first sensor does not detect an article at the lower end of the conveyor.

4. The method of claim 1 wherein said first brake comprises at least a first brake pad and a second brake pad, said second brake pad spaced from, and located upstream of, said first brake pad.

5. The method of claim 1 further comprising:

providing a second brake located upstream of said first brake; and turning on said second brake in a cyclical manner.

6. The method of claim 5 further comprising:

providing a third brake located upstream of said second brake; and turning said third brake on in a cyclical manner.

7. The method of claim 1 further comprising:

providing a second sensor located upstream of said first brake, said second sensor detecting the presence or absence of an article in the vicinity of said second sensor;

providing a second brake located upstream of said first brake; and turning said second brake on for a predetermined amount of time when said second sensor detects the leading edge of an article.

8. The method of claim 7 wherein said predetermined amount of time is greater than half of a second.

9. The method of claim 1 further comprising:

providing a second brake located upstream of said first brake;

providing a second sensor located upstream of said first sensor, said second sensor detecting the presence or absence of an article in the vicinity of said second sensor; and turning said second brake on after both said first and said second sensors both detect articles.

10. A method of controlling a gravity conveyor having a plurality of rollers arranged in a descending manner from art upper to a lower end such that articles move by force of gravity down said conveyor, said method comprising:

providing a first sensor adapted to detect the presence or absence of an article at the lower end of the conveyor;

providing a first brake located upstream of said first sensor, said first brake adapted to be turned on or off, said first brake substantially preventing at least one associated roller from rotating when turned on and allowing the at least one associated roller to rotate when turned off;

sending a pulsed signal to said first brake adapted to cause said first brake to cyclically turn on, turning said first brake on when said first sensor detects an article at the lower end of the conveyor; and terminating said pulsed signal if said first sensor has not changed from detecting the absence or presence of an article for more than a predetermined amount of time.

11. The method of claim 10 wherein said predetermined amount of time is greater than ten seconds.

12. A method of controlling a gravity conveyor having a plurality of rollers arranged in a descending manner from an upper to a lower end such that articles move by force of gravity down said conveyor, said method comprising:
- providing a first sensor adapted to detect the presence or absence of an article at the lower end of the conveyor;
- providing a first brake located upstream of said first sensor, said first brake adapted to be turned on or off, said first brake substantially preventing at least one associated roller from rotating when turned on and allowing the at least one associated roller to rotate when turned off;
- turning said first brake on when said first sensor detects an article at the lower end of the conveyor; and
- keeping said first brake on for a predetermined minimum amount of time after said first sensor transitions from not detecting an article to detecting an article.

13. The method of claim 12 wherein said predetermined minimum amount of time is greater than or equal to one quarter of a second.

14. A method of controlling a gravity conveyor having a plurality of rollers arranged in a descending manner from an upper to a lower end such that articles move by force of gravity down said conveyor, said method comprising:
- providing a first sensor adapted to detect the presence or absence of an article at the lower end of the conveyor;
- providing a first brake located upstream of said first sensor, said first brake adapted to be turned on or off, said first brake substantially preventing at least one associated roller from rotating when turned on and allowing the at least one associated roller to rotate when turned off;
- turning said first brake on when said first sensor detects an article at the lower end of the conveyor;
- providing a second brake located upstream of said first brake;
- providing a second sensor located upstream of said first sensor, said second sensor detecting the presence or absence of an article in the vicinity of said second sensor;
- turning said second brake on after both said first and said second sensors both detect articles;
- determining when said first and second sensors have both detected no change in the presence or absence of articles for at least a predetermined period of time; and
- maintaining both said first arid second brakes in their current on or off state for at least as long as said first and said second sensors continue to detect no change in the absence or presence of articles.

15. A method of controlling a gravity conveyor having a plurality of rollers arranged in a descending manner from an upper to a lower end such that articles move by force of gravity down said conveyor, said method comprising:
- providing a first sensor adapted to detect the presence or absence of an article at the lower end of the conveyor;
- providing a first brake located upstream of said first sensor, said first brake adapted to be turned on or off, said first brake substantially preventing at least one associated roller from rotating when turned on and allowing the at least one associated roller to rotate when turned off;
- turning said first brake on when said first sensor detects an article at the lower end of the conveyor;
- providing a second brake located upstream of said first brake; and
- turning said second brake on for at least a predetermined time period whenever said first sensor changes from detecting the presence of an article to detecting the absence of an article.

16. A method of controlling a gravity conveyor having plurality of rollers arranged in a descending manner from an upper to a lower end such that articles move by force gravity down said conveyor, said method comprising:
- providing a first sensor adapted to detect the presence or absence of an article at the lower end of the conveyor;
- providing a first brake located upstream of said first sensor, said first brake adapted to be turned on or off, said first brake substantially preventing at least one associated roller from rotating when turned on and allowing the at least one associated roller to rotate when turned off;
- turning said first brake on when said first sensor detects an article at the lower end of the conveyor;
- providing a second brake located upstream of said first brake;
- providing a second sensor located upstream of said first sensor, said second sensor detecting the presence or absence of an article in the vicinity of said second sensor; and
- turning said second brake on after both said first and said second sensors both detect articles, said second brake being adapted to stop, when turned on, at least one roller upstream of said second sensor and at least one roller downstream of said second sensor.

17. A method of controlling a gravity conveyor having a plurality of rollers arranged in a descending manner from an upper to a lower end such that articles move by force of gravity down said conveyor, said method comprising:
- providing a first sensor adapted to detect the presence or absence of an article at the lower end of the conveyor;
- providing a first brake located upstream of said first sensor, said first brake adapted to be tuned on or off, said first brake substantially preventing at least one associated roller from rotating when turned on and allowing the at least one associated roller to rotate when turned off;
- turning said first brake on when said first sensor detects an article at the lower end of the conveyor;
- providing a second brake located upstream of said first brake;
- providing a second sensor located upstream of said first sensor, said second sensor detecting the presence or absence of an article in the vicinity of said second sensor;
- providing a third brake located upstream of said second brake;
- providing a third sensor located upstream of said second sensor, said third sensor detecting the presence or absence of an article in the vicinity of said third sensor; and
- turning said third brake on after both said first and said third sensors detect the presence of an article.

18. The method of claim 17 wherein said second brake is adapted to stop, when turned on, at least one roller upstream of said second sensor and at least one roller downstream of said second sensor.

19. The method of claim 18 wherein said third brake is adapted to stop, when turned on, at least one roller upstream of said third sensor and at least one roller downstream of said third sensor.

20. A method of controlling a gravity conveyor having a plurality of rollers arranged in a descending manner from an upper to a lower end such that articles move by force of gravity down said conveyor, said method comprising:

providing a first sensor adapted to detect the presence or absence of an article at the lower end of the conveyor;

providing a first brake located upstream of said first sensor, said first brake adapted to be turned on or off, said first brake substantially preventing at least one associated roller from rotating when turned on and allowing the at least one associated roller to rotate when turned off;

turning said first brake on when said first sensor detects an article at the lower end of the conveyor;

providing a second brake located upstream of said first brake;

turning on said second brake in a cyclical manner; and stopping the cyclical turning on of said second brake after said first sensor detects no change in the presence or absence of articles for at least a predetermined amount of time.

21. The method of claim 20 wherein said predetermined amount of time is greater than or equal to ten seconds.

22. A method of controlling a gravity conveyor having a plurality of rollers arranged in a descending manner from an upper to a lower end such that articles move by force of gravity down said conveyor, said method comprising:

providing a first sensor adapted to detect the presence or absence of an article at the lower end of the conveyor;

providing a first brake located upstream of said first sensor, said first brake adapted to be turned on or off, said first brake substantially preventing at least one associated roller from rotating when turned on and allowing the at least one associated roller to rotate when turned off;

timing said first brake on when said first sensor detects an article at the lower end of the conveyor;

providing a second brake located upstream of said first brake;

turning on said second brake in a cyclical manner;

providing third brake located upstream of said second brake;

turning said third brake on in a cyclical manner; and stopping the cyclical turning on of said second and third brakes after said first sensor detects no change in the presence or absence of articles for at least a predetermined amount of time.

23. A method of controlling a gravity conveyor having a plurality of rollers arranged in a descending manner from an upper to a lower end such that articles move by force of gravity down said conveyor, said method comprising:

providing a first sensor adapted to detect the presence or absence of an article at the lower end of the conveyor;

providing a first brake located upstream of said first sensor, said first brake adapted to be turned on or off, said first brake substantially preventing at least one associated roller from rotating when turned on and allowing the at least one associated roller to rotate when turned off;

turning said first brake on when said first sensor detects an article at the lower end of the conveyor;

providing a second brake located upstream of said first brake;

turning on said second brake in a cyclical manner;

providing a third brake located upstream of said second brake;

turning said third brake on in a cyclical manner and providing a second sensor located upstream of said first sensor wherein said second brake is adapted to stop, when turned on, at least one roller upstream of said second sensor and at least one roller downstream of said second sensor.

24. A method of controlling a gravity conveyor having a plurality of rollers and in a descending manner from an upper to a lower end such that articles move by force of gravity down said conveyor, said method comprising:

providing a first sensor adapted to detect the presence or absence of an article at the lower end of the conveyor;

providing a first brake located upstream of said first sensor, said first brake adapted to be turned on or off, said first brake substantially preventing at least one associated roller from rotating when turned on and allowing the at least one associated roller to rotate when turned off, turning said first brake on when said first sensor detects an article at the lower end of the conveyor;

providing a second brake located upstream of said first brake;

providing a second sensor located upstream of said first sensor, said second sensor detecting the presence or absence of an article in the vicinity of said second sensor;

providing a third brake located upstream of said second brake;

providing a third sensor located upstream of said second sensor, said third sensor detecting the presence or absence of an article in the vicinity of said third sensor; and turning said third brake on after both said second and said third sensors detect the presence of an article.

25. A gravity conveyor comprising:

a plurality of rollers arranged in a descending manner from an upper end to a lower end such that articles move by force of gravity down said conveyor;

a first sensor adapted to detect the presence or absence of an article at the lower end of the conveyor;

a first brake located upstream of said first sensor, said first brake adapted to be turned on or off, said first brake substantially preventing at least one associated roller from rotating when turned on and allowing the at least one associated roller to rotate when turned off; and a controller adapted to send first and second signals to said first brake, said first signal being a pulsed signal having a defined frequency and adapted to cause said first brake to cyclically turn on, said second signal being adapted to turn said first brake on and being sent when said first sensor detects an article at the lower end of the conveyor.

26. The conveyor of claim 25 wherein said first brake comprises at least a first and a second brake pad, said second brake pad spaced from, and located upstream of, said first brake pad.

27. The conveyor of claim 25 said controller is further adapted to turn said first brake off between the noises of said first signal when said first sensor detects the absence of an article at the lower end of the conveyor.

28. The conveyor of claim 25 further including a second brake located upstream of said first brake and a second sensor located upstream of said first sensor, said controller further being adapted to control said second brake.

29. The conveyor of claim 28 wherein said controller is adapted to turn said second brake on when both said first and said second sensors detect articles.

30. The conveyor of claim 28 wherein said controller is adapted to turn said second brake on when said second sensor detects the leading edge of an article.

31. The conveyor of claim 28 wherein said controller is adapted to turn said second brake on after said first sensor detects the absence of an article.

32. The conveyor of claim 31 wherein said controller is further adapted to maintain said second brake on for a predetermined amount of time after said first sensor detects the absence of an article.

33. The conveyor of claim 28 wherein said controller is adapted to turn said second brake on in a cyclical manner.

34. The conveyor of claim 33 wherein said controller is programmable and the duration of the cycle can be changed.

35. The conveyor of claim 28 further comprising a line of pressurized air in operable communication with said first and said second brakes, said pressurized air being to turn said brakes on or off.

36. The conveyor of claim 25 wherein said controller is a programmable logic controller.

37. The conveyor of claim 36 wherein said controller is further adapted to control a plurality of brakes on a plurality of different gravity conveyors.

38. A gravity conveyor having a plurality of rollers arranged in a descending manner from an upper to a lower end such that articles move by force of gravity down said conveyor, said conveyor comprising:
   a plurality of zones, each of said plurality of zones having at least one brake adapted to prevent at least one associated roller from rotating when turned on;
   at least one sensor associated with each of said plurality of zones, each said sensor adapted to detect the presence or absence of articles within die vicinity of the sensor;
   a controller adapted to send a pulsed signal having a defined frequency to each of said brake cyclically turn each of said brakes on, said controller further adapted to stop sending said pulsed signal when each of said sensors has not detected a change in the absence or presence of an article for more than a predetermined amount of time.

39. The conveyor of claim 38 wherein said controller is adjustable such that said predetermined amount of time can be adjusted by an operator.

40. The conveyor of claim 38 wherein said plurality of zones includes at least three zones.

41. The conveyor of claim 38 said predetermined amount of time is greater than 10 seconds.

42. The conveyor of claim 38 wherein said controller is a programmable logic controller.

43. The conveyor of claim 38 wherein said controller is adjustable such that the length of the pulses in said pulsed signal can be adjusted by an operator.

44. The conveyor of claim 38 said controller is adjustable such that the length of time between the pulses in said pulsed signal can be adjusted by an operator.

45. The conveyor of claim 38 wherein said controller is further adapted to turn on the brake in said downstream-most zone when the sensor in said downstream-most zone detects an article.

46. The conveyor of claim 45 wherein said controller is further adapted to turn on the brake in an adjacent zone to said downstream-most zone when the sensors in both said adjacent zone and said downstream-most zone detect articles.

* * * * *

UNITED STATES PATENT AND TRADEMARK OFFICE
CERTIFICATE OF CORRECTION

PATENT NO. : 6,640,953 B2
DATED : November 4, 2003
INVENTOR(S) : Gerald A. Brouwer and Clint R. Lupton It is certified that error appears in the above-identified patent and that said Letters Patent is hereby corrected as shown below:

Column 2,
Line 17, "fall" should be -- full --.

Column 9,
Line 6, "I2-I4" should be -- I1-I4 --.

Column 11,
Line 39, "I2-3" should be -- I1-3 --.

Column 12,
Line 42, "considerably:" should be -- considerably. --.

Column 14,
Line 3, "on:" should be -- on; --.
Line 47, "art" should be -- an --.

Column 15,
Line 48, "arid" should be -- and --.

Column 16,
Line 8, insert "a" before "plurality".
Line 9, insert "of" between "force" and "gravity"
Line 39, "tuned" should be -- turned --.

Column 17,
Line 38, "timing" should be -- turning --.
Line 43, insert -- a -- after "providing".

Column 18,
Line 4, "manner" should be -- manner; --.
Line 11, "and" should be -- arranged --.
Line 21, "off," should be -- off; --.
Line 60, insert -- wherein -- after "claim 25".
Line 61, "noises" should be -- pulses --.

UNITED STATES PATENT AND TRADEMARK OFFICE
CERTIFICATE OF CORRECTION

PATENT NO. : 6,640,953 B2
DATED : November 4, 2003
INVENTOR(S) : Gerald A. Brouwer and Clint R. Lupton It is certified that error appears in the above-identified patent and that said Letters Patent is hereby corrected as shown below:

Column 19,
Line 22, insert -- used -- after "being".
Line 38, "die" should be -- the --.

Column 20
Line 2, "brake" should be -- brakes to --.
Line 13, insert -- wherein -- after "claim 38".
Line 20, insert -- wherein -- after "claim 38".

Signed and Sealed this

First Day of June, 2004

JON W. DUDAS
*Acting Director of the United States Patent and Trademark Office*